US010033559B2

(12) United States Patent
Wang et al.

(10) Patent No.: US 10,033,559 B2
(45) Date of Patent: Jul. 24, 2018

(54) METHOD, APPARATUS AND SYSTEM FOR DETECTING RANDOM ACCESS SIGNAL

(71) Applicant: ZTE CORPORATION, Shenzhen (CN)

(72) Inventors: Wenfang Wang, Shenzhen (CN); Shaopeng Wang, Shenzhen (CN); Hongfeng Qin, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 0 days.

(21) Appl. No.: 15/319,950

(22) PCT Filed: Aug. 27, 2014

(86) PCT No.: PCT/CN2014/085340
§ 371 (c)(1),
(2) Date: Mar. 29, 2017

(87) PCT Pub. No.: WO2015/192474
PCT Pub. Date: Dec. 23, 2015

(65) Prior Publication Data
US 2017/0201397 A1    Jul. 13, 2017

(30) Foreign Application Priority Data

Jun. 18, 2014   (CN) .......................... 2014 1 0274262

(51) Int. Cl.
*H04L 27/00* (2006.01)
*H04L 25/08* (2006.01)
(Continued)

(52) U.S. Cl.
CPC .......... *H04L 25/085* (2013.01); *H04L 25/022* (2013.01); *H04L 27/265* (2013.01); *H04W 74/0833* (2013.01)

(58) Field of Classification Search
CPC .............. H04B 1/1027; H04W 74/0833; H04J 11/005; H04L 27/2663
See application file for complete search history.

(56) References Cited

U.S. PATENT DOCUMENTS 4,612,549 A * 9/1986 Geyer, Jr. ............. G01S 7/2813
342/379
8,731,605 B1 * 5/2014 Shetty ................... H04W 48/18
455/435.2
(Continued)

FOREIGN PATENT DOCUMENTS

CN           1829117        9/2006
CN         101295999       10/2008
(Continued)

OTHER PUBLICATIONS

International Search Report for PCT/CN2014/085340, English Translation attached to original, Both completed by the Chinese Patent Office dated Jan. 28, 2015, All together 6 Pages.
(Continued)

*Primary Examiner* — Chieh M Fan
*Assistant Examiner* — Berhanu Tadese
(74) *Attorney, Agent, or Firm* — Plumsea Law Group, LLC

(57) ABSTRACT

The present disclosure provides a method for detecting a random access signal. The method includes: determining a temporary peak detection sequence according to a received time domain random access signal; determining an interference cancellation weight for a frequency domain cyclic shift sequence corresponding to a search window in the temporary peak detection sequence, and performing interference cancellation on the temporary peak detection sequence according to the interference cancellation weight, obtaining a final peak detection sequence; and performing peak detection on the final peak detection sequence. The present
(Continued)

disclosure discloses an apparatus and system for detecting a random access signal at the same time. According to the method, the present disclosure can eliminate the deterioration of the leak detection performance and the false detection performance caused by the interference during the random access signal detection, improve the detection accuracy and save resources.

14 Claims, 3 Drawing Sheets

(51) Int. Cl.
*H04W 74/08* (2009.01)
*H04L 27/26* (2006.01)
*H04L 25/02* (2006.01)

(56) References Cited

U.S. PATENT DOCUMENTS

| | | | | |
|---|---|---|---|---|
| 9,680,682 B2* | 6/2017 | Kim | ............ | H04L 27/2655 |
| 2009/0147890 A1* | 6/2009 | Lee | ............ | H04B 7/0851 |
| | | | | 375/341 |
| 2012/0264388 A1* | 10/2012 | Guo | ............ | H04B 7/0865 |
| | | | | 455/307 |
| 2013/0102254 A1* | 4/2013 | Cyzs | ............ | H04B 1/126 |
| | | | | 455/63.1 |
| 2014/0187276 A1* | 7/2014 | Cyzs | ............ | H04J 11/0023 |
| | | | | 455/501 |
| 2014/0219162 A1* | 8/2014 | Eyuboglu | ............ | H04W 16/26 |
| | | | | 370/315 |
| 2015/0181595 A1* | 6/2015 | Li | ............ | H04W 56/00 |
| | | | | 370/336 |
| 2015/0381221 A1* | 12/2015 | Cyzs | ............ | H04B 1/7097 |
| | | | | 375/346 |
| 2016/0173315 A1* | 6/2016 | KIm | ............ | H04L 27/2663 |
| | | | | 375/362 |
| 2016/0219621 A1* | 7/2016 | Kim | ............ | H04W 56/0005 |
| 2017/0019929 A1* | 1/2017 | Wang | ............ | H04B 1/1027 |
| 2017/0201397 A1* | 7/2017 | Wang | ............ | H04L 25/085 |

FOREIGN PATENT DOCUMENTS

| | | | | |
|---|---|---|---|---|
| CN | 102204389 | | 9/2011 | |
| EP | 3104657 | | 12/2016 | |
| EP | 3104657 A1 * | | 12/2016 | ............ H04B 1/1027 |
| WO | 2011120255 | | 10/2011 | |
| WO | WO 2011120255 A1 * | | 10/2011 | ............ H04L 27/266 |

OTHER PUBLICATIONS

Extended European Search Report for European Application No. EP 14895169.2, Completed by the European Patent Office, dated Jun. 26, 2017, 7 Pages.

Chen et al. Semantics, Knowledge and Grid, 2009. SKG 2009. Fifth International Conference on, IEEE, Piscataway, NJ, USA, ISBN 978-0-7695-3810-5, pp. 346-350, XP031593870, "Random Access Algorithm of LTE TDD System Based on Frequency Domain Detection".

* cited by examiner

METHOD, APPARATUS AND SYSTEM FOR DETECTING RANDOM ACCESS SIGNAL

CROSS-REFERENCE TO RELATED APPLICATION

This application is the U.S. national phase of PCT Application No. PCT/CN2014/085340 filed Aug. 27, 2014, which claims priority to Chinese Application No. 201410274262.7 filed Jun. 18, 2014, the disclosures of which are incorporated in their entirety by reference herein.

TECHNICAL FIELD

The present disclosure relates to the field of mobile communication technology, and in particular to a method, apparatus and system for detecting a random access signal.

BACKGROUND

In the Long Term Evolution (referred to as LTE) system, after be powered on, the mobile terminal first performs the downlink synchronization through the synchronization Channel (referred to as SCH), to determine the receiving starting point and the cell number (cell ID) of the wireless frame and subframe; and then obtains the system information through detecting the Broadcast Channel (referred to as BCH), and the system information includes the configuration information of the Random Access Channel (referred to as RACH), and finally, the uplink synchronization is performed on the random access signal transmitted by the RACH, to complete the work of accessing the system.

In the process of the uplink synchronization of the mobile terminal, the location of the RACH is first found based on the receiving starting point of the wireless frame and sub frame determined during the downlink synchronization, and the starting point for sending the uplink random access preamble is determined, and then one sequence is selected randomly from the available sequences as the uplink random access preamble of the random access signal for transmission. The base station detects the uplink random access preamble, to determine the timing adjustment amount of the uplink synchronization, and sends it to the mobile terminal; and the mobile terminal adjusts the sending time of the uplink signal according to the timing adjustment amount, to achieve the time synchronization of the uplink channel.

The uplink random access preamble in the existing LTE system is generated by one or more Zadoff-Chu (ZC) root sequences. The $u^{th}$ ZC root sequence is defined as $$x_u(n) = e^{-j\frac{\pi u n(n+1)}{N_{ZC}}},$$

$0 \leq n \leq N_{ZC}-1$. Herein, the length of the ZC sequence $N_{ZC}$ is 839 under the formats 0-3, and is 139 in the format 4. There are 64 sequences used to generate the uplink random access preamble in every cell, and the 64 sequences can not only be various cyclic shift sequences from the same root sequence, but also can be the cyclic shift sequences from different root sequences. The ZC root sequence is a Constant Amplitude zero Auto-correlation Code (referred to as CAZAC), and its correlation has the following characteristics: the correlation among different cyclic sequences of the same root sequence is 0; and the correlation of different root sequences (including their cyclic shift sequences of each other) is $1/\sqrt{N_{ZC}}$, that is, the correlation between the uplink random access preamble of the random access signal and the rest of the sequences is very small, which can be regarded as approximately equal to zero, while the correlation between the uplink random access preamble of the random access signal and the sequence generating the preamble is maximum. Therefore, the method in which the correlation between the uplink random access preamble random access signal and all sequences of the random access signal can use in time domain detection to judge the random access preamble transmitted by the terminal, and then obtain the uplink timing adjustment amount, realize the time synchronization of the uplink channel.

The existing method for detecting the random access signal has the problem of higher index of leak detection or false detection in the interference environment. When there is a larger interference from the adjacent cell, the signal peak in the existing method for detecting the random access signal will be drowned in the interference and noise, which leads to the leak detection; at the same time, a wrong peak is detected because of the impact of interference, leading to the false detection. In addition, when there are signals with large and small power coexisted in the present cell, the signal with the large power is the interface of the present cell relative to the signal with the small power, which will enlarge the possibility of leak detecting the 1 signal with the small power. Some existing methods of serial interference cancellation first subtract the reconstructed interference signal from the received random access signal, and then perform the detection, and subtract a reconstructed useful signal again from the received random access signal when every useful signal is detected, and then perform the detection. That type of methods must first know the interference signal, which has a high requirement for the system; and secondly, it needs multiple times of reconstruction, which occupies a large amount of resources; the computation is very large, and is difficult to be realized and applied.

In short, the existing technology has at least the following shortcomings: the method for detecting the random access signal does not consider the interference effect, there are problems of higher index of leak detection or false detection in the adjacent cell interference environment, at the same time the requirement to the system is relatively high, the occupied resources are large, and it is difficult to be achieved and applied.

SUMMARY

The present disclosure provides a method, apparatus and system for detecting a random access signal to eliminate the deterioration of the leak detection performance and the false detection performance caused by the interference.

According to one aspect, the present disclosure discloses a method for detecting a random access signal, including:

determining a temporary peak detection sequence according to a received time domain random access signal;

determining an interference cancellation weight for a frequency domain cyclic shift sequence corresponding to a search window in the temporary peak detection sequence, and performing interference cancellation on the temporary peak detection sequence according to the interference cancellation weight, obtaining a final peak detection sequence; and performing peak detection on the final peak detection sequence.

According to another aspect, the present disclosure discloses an apparatus for detecting a random access signal, including:

an obtaining module, arranged to: determine a temporary peak detection sequence according to a received time domain random access signal;

an interference cancellation module, arranged to: determine an interference cancellation weight for a frequency domain cyclic shift sequence corresponding to a search window in the temporary peak detection sequence, and perform interference cancellation on the temporary peak detection sequence according to the interference cancellation weight, obtain a final peak detection sequence; and a detection module, arranged to: perform peak detection on the final peak detection sequence.

The method, apparatus and system for detecting a random access signal are arranged to receive a time domain random access signal and obtain a temporary peak detection sequence; compute an interference cancellation weight for a frequency domain cyclic shift sequence corresponding to a search window in the temporary peak detection sequence, and perform interference cancellation on the temporary peak detection sequence, to obtain a final peak detection sequence; and perform peak detection on the final peak detection sequence. The method and apparatus disclosed by the present disclosure can eliminate the deterioration of the leak detection performance and the false detection performance caused by the interference during the random access signal detection, improve the detection accuracy and save resources.

SPECIFIC EMBODIMENTS

The main implementation principles, specific implementation modes and beneficial effects, which can be achieved thereby, of the technical scheme disclosed by the present disclosure are described in details by combining with various accompanying figures hereinafter.

Figure 1:
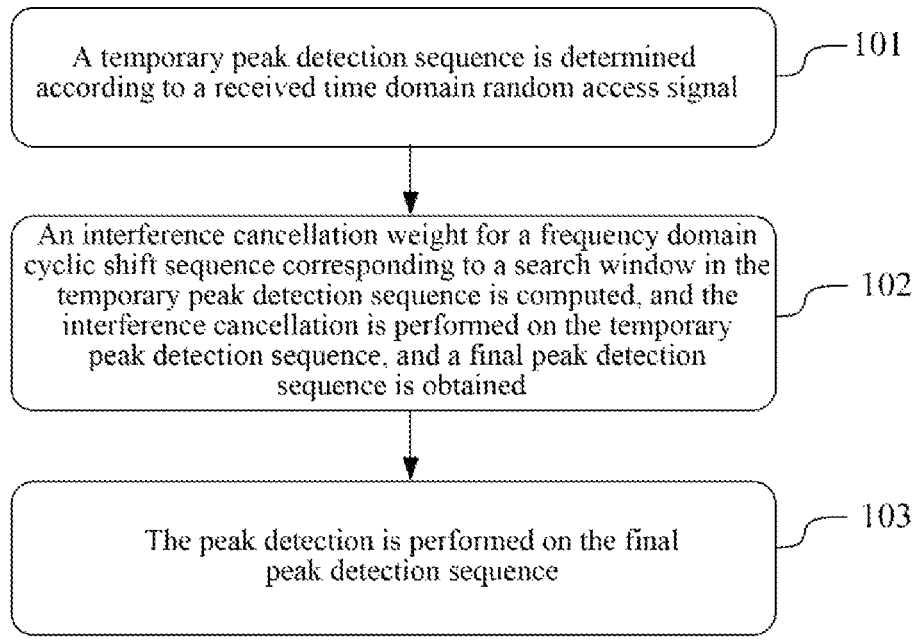
FIG. 1 is a flow chart of a method for detecting a random access signal of an embodiment of the present invention.

Embodiment one is a method for detecting a random access signal provided by the present disclosure as shown in FIG. 1. The method includes the following steps.

In step 101, a base station determines a temporary peak detection sequence according to a received time domain random access signal.

The base station determines the temporary peak detection sequence according to the received time domain random access signal. The temporary peak detection sequence may be a temporary peak detection sequence of a local root sequence, and can also be a temporary peak detection sequence of a cyclic shift sequence, while, the amount of computation is large under the condition of multiple users when the temporary peak detection sequence of the cyclic shift sequence is used, therefore, the temporary peak detection sequence of the local root sequence is appreciated. The specific process of determining the temporary peak detection sequence can be that: for the received time domain random access signal, the base station transforms the random access signal from the time domain to the frequency domain through the Fast Fourier Transform (referred to as FFT) process, performs the conjugate dot product on the frequency domain random access signal with a frequency domain value of the local root sequence or the cyclic shift sequence, and then transforms the RACH signal from the frequency domain to the time domain through the Inverse Fast Fourier Transform (referred to as IFFT) process, obtains the temporary peak detection sequence. Of course, other modes can also be used to obtain the temporary peak detection sequence, which will not be enumerated here.

In step 102, the base station determines an interference cancellation weight for a frequency domain cyclic shift sequence corresponding to a search window in the temporary peak detection sequence, and performs interference cancellation on the temporary peak detection sequence, obtains a final peak detection sequence.

The specific process of that step can be: computing the interference cancellation weight in turn for a frequency domain cyclic shift sequence corresponding to a search window in the temporary peak detection sequence, and performing weighted combination and then computing modular square on the temporary peak detection sequence according to the interference cancellation weight, and thus obtaining the final peak detection sequence.

M is set to as the number of receiving antennas; N is the number of subcarriers, S is a frequency domain local cyclic shift sequence, Y is a frequency domain random access signal before the interference cancellation, Z is a temporary peak detection sequence, $\hat{Z}$ is a final peak detection sequence, and then the specific interference cancellation method can be as shown in the following formula (1) and (2).

$$W = R_{SY} R_{YY}^{-1} \quad (1)$$

$$\hat{Z} = |WZ|^2 \quad (2)$$

Herein, $R_{SY} = E\{SY^H\}$, $R_{YY} = E\{YY^H\}$ $R_{SY}$ represents a cross-correlation covariance matrix of the frequency domain random access signal and the frequency domain local cyclic shift sequence, $R_{YY}$ represents an autocorrelation covariance matrix of the frequency domain random access signal, the dimension of S is 1×N, the dimension of Y is M×N, the dimension of Z is M×N and the dimension of $\hat{Z}$ is 1×N.

In step 103, the base station performs peak detection on the final peak detection sequence.

Herein, the specific process of the peak detection can be: performing a noise mean estimation on the final peak detection sequence, and determining a signal detection threshold according to the estimation value, then detecting a signal in the search window corresponding to a current frequency domain cyclic shift sequence, that is, a frequency domain local cyclic shift sequence adopted when performing the weight estimation in step 102, and filtering a signal exceeding the detection threshold.

Step 102 to step 103 are repeated, until all cyclic shift sequences of all root sequences are completely processed.

From the above description, it can be seen that the method provided by the embodiment of the present disclosure can overcome the disadvantages that the existing serial interference cancellation algorithm needs to know the interference signal and requires multiple times of reconstruction with too much computation, and realize the function of eliminating the deterioration of the leak detection performance and the false detection performance caused by the interference during the random access signal detection, improve the detection accuracy and save resources.

Figure 2:
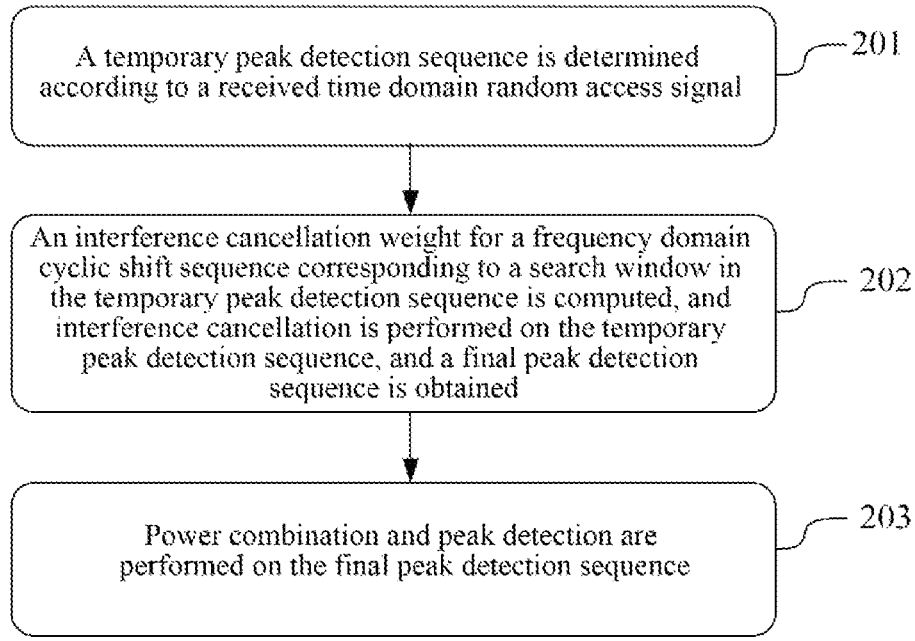
FIG. 2 is a flow chart of a detection method of first performing power combination on a final peak detection sequence in a repeat format according to an embodiment of the present invention.

Embodiment 2 can adopt the following method when the random access signal is a random access signal in a repeat format; as shown in FIG. 2, the method includes the following steps.

In step 201, same as step 101.

In step 202, same as step 102.

In step 203, the base station performs power combination and peak detection on the final peak detection sequence.

Herein, the specific process of the power combination and the peak detection can be: first performing power combination on the final peak detection sequence corresponding to the two repeated parts, then performing a noise mean estimation on the combined peak detection sequence, and obtaining a signal detection threshold according to the estimation value, then detecting a signal in the search window corresponding to a current frequency domain cyclic shift sequence, and filtering a signal exceeding the signal detection threshold.

Herein, the method of power combination can be an equal gain combination, and can also be a maximum ratio combination, etc.

Step 202 to step 203 are repeated, until all cyclic shift sequences of all root sequences are completely processed.

Figure 3:
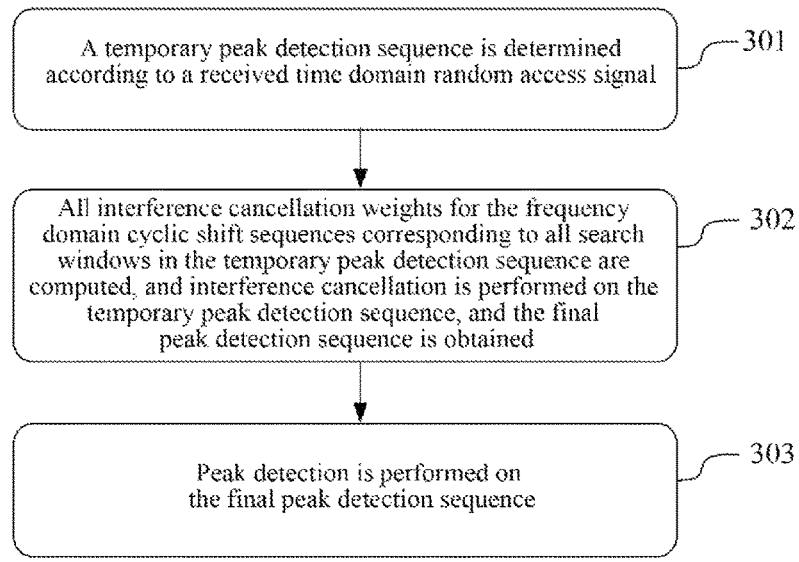
FIG. 3 is a flow chart of a detection method of performing interference cancellation on multiple search windows in a temporary peak detection sequence together according to an embodiment of the present invention.

Embodiment 3 is another method for detecting a random access signal; as shown in FIG. 3, the method includes the following steps.

In step 301, same as step 101;

In Step 302, similar with step 102, while the difference lies in computing all interference cancellation weights for the frequency domain cyclic shift sequences corresponding to all search windows in the temporary peak detection sequence, performing weighted combination and then computing modular square on signals in all search windows in the temporary peak detection sequence respectively according to the interference cancellation weight, and thus obtaining the final peak detection sequence.

In step 303, similar to step 103, now the current frequency domain cyclic shift sequence is all frequency domain cyclic shift sequences used for calculating the interference cancellation weight in the step 302.

Step 302 to step 303 are repeated, until all cyclic shift sequences of all root sequences are completely processed.

From the above description, it can be seen that the method provided according to the embodiment of the present disclosure performs the interference cancellation on the temporary peak detection sequence by using the interference cancellation weight, to achieve the objective of improving the leak detection performance and the false detection performance of the random access signal. At the same time, it also can improve the leak detection performance of the signal with the small power when the signals with the large powers and the signals with the small powers coexisted in the present cell, so as to further improve the system performance. In addition, because the method provided by the embodiment of the present disclosure does not need the characteristics of the interference signal of the adjacent cell, and also does not need to reconstruct the interference signal of the adjacent cell and the interference signal of the present cell, while it directly realizes the interference cancellation, the amount of computation is small and the resources are saved, which is conducive to the implementation of the system.

Figure 4:
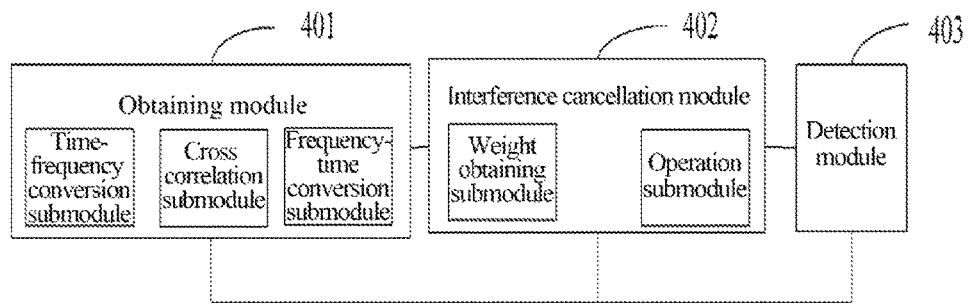
FIG. 4 is a diagram of an apparatus for detecting a random access signal of an embodiment of the present invention.

Accordingly, an embodiment of the present disclosure further provides an apparatus for detecting a random access signal, of which the structure is as shown in FIG. 4, specifically including an obtaining module 401, an interference cancellation module 402 and a detection module 403.

The obtaining module 401 is arranged to: determine a temporary peak detection sequence according to a received time domain random access signal.

The interference cancellation module 402 is arranged to: determine an interference cancellation weight for a frequency domain cyclic shift sequence corresponding to a search window in the temporary peak detection sequence, and perform interference cancellation on the temporary peak detection sequence according to the interference cancellation weight, obtain a final peak detection sequence.

The detection module 403 is arranged to: perform peak detection on the final peak detection sequence.

In an exemplary embodiment, the obtaining module 401 may further include a time-frequency conversion submodule, a cross correlation submodule and a frequency-time conversion submodule, The time-frequency conversion submodule is arranged to: perform fast fourier transform (FFT) on a received time domain random access signal, to obtain a frequency domain random access signal.

The cross correlation submodule is arranged to: perform conjugate dot product on the frequency domain random access signal with a frequency domain value of a local root sequence or a cyclic shift sequence; and The frequency-time conversion submodule is arranged to: perform inverse fast fourier transform (IFFT) on an output result of the cross correction submodule, to obtain a temporary peak detection sequence.

In an exemplary embodiment, the interference cancellation module 402 may further include a weight obtaining submodule and an operation submodule.

The weight obtaining submodule is arranged to: determine an interference cancellation weight for a frequency domain cyclic shift sequence corresponding to a search window in the temporary peak detection sequence; and The operation submodule is arranged to: perform weighted combination and then compute modular square on the temporary peak detection sequence according to an output result of the weight obtaining submodule, and thus obtain the final peak detection sequence.

Figure 5:
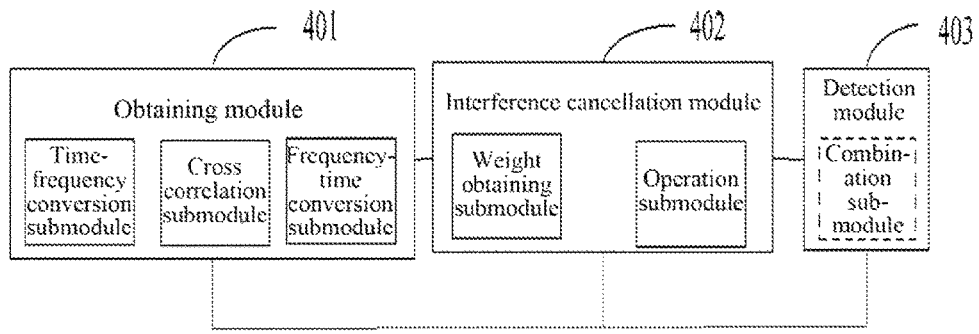
FIG. 5 is a diagram of a detection apparatus of first performing power combination on a final peak detection sequence in a repeat format according to an embodiment of the present invention.

In an exemplary embodiment, as shown in FIG. 5, the detection module 403 may further include a combination submodule, arranged to: perform power combination on the final peak detection sequence corresponding to two repeated parts when the random access signal is a random access signal in a repeat format.

From the above description, it can be seen that the apparatus provided according to the embodiment of the present disclosure obtains a temporary peak detection sequence according to a time domain random access signal, computes an interference cancellation weight for a frequency domain cyclic shift sequence corresponding to a search window in the temporary peak detection sequence, and performs weighted combination on the temporary peak detection sequence, to realize the interference cancellation, and to achieve the objective of improving the leak detection performance and the false detection performance of the random access signal. At the same time, it also can improve the leak detection performance of the signal with the small power when the signals with large powers and the signals with small powers coexisted in the present cell, so as to further improve the system performance. In addition, because the method provided by the embodiment of the present disclosure does not need the characteristics of the interference signal of the adjacent cell, and also does not need to reconstruct the interference signal of the adjacent cell and the interference signal of the present cell, while it directly realizes the interference cancellation, the amount of computation is small and the resources are saved, which is conducive to the implementation of the system.

Figure 6:
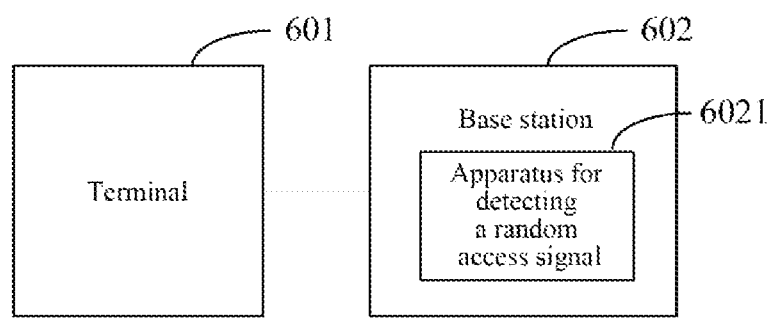
FIG. 6 is a structure diagram of a system for detecting a random access signal of an embodiment of the present invention.

Accordingly, an embodiment of the present disclosure further provides a system for detecting a random access signal, as shown in FIG. 6, including a terminal 601 and a base station 602, herein, the terminal 601 is arranged to transmit a random access signal to the base station 602; the base station 602 includes: an apparatus for detecting a random access signal 6021, arranged to receive a time domain random access signal and obtain a temporary peak detection sequence; compute interference an cancellation weight for a frequency domain cyclic shift sequence corresponding to a search window in the temporary peak detection sequence, and perform interference cancellation on the temporary peak detection sequence, obtain a final peak detection sequence; and perform peak detection on the final peak detection sequence.

In an exemplary embodiment, the apparatus for detecting the random access signal 6021 includes an obtaining module, an interference cancellation module, and a detection module.

The obtaining module is arranged to: determine a temporary peak detection sequence according to a received time domain random access signal.

The interference cancellation module, arranged to: determine the interference cancellation weight for a frequency domain cyclic shift sequence corresponding to a search window in the temporary peak detection sequence, and perform interference cancellation on the temporary peak detection sequence according to the interference cancellation weight, obtain a final peak detection sequence.

The detection module is arranged to: perform peak detection on the final peak detection sequence.

From the above description, it can be seen that the method and apparatus provided according to the embodiment of the present disclosure obtain a temporary peak detection sequence according to a time domain random access signal, compute an interference cancellation weight for a frequency domain cyclic shift sequence corresponding to a search window in the temporary peak detection sequence, and perform weighted combination on the temporary peak detection sequence, thus obtaining the temporary peak detection sequence after the interference cancellation and realizing the interference cancellation, to achieve the objective of improving the leak detection performance and the false detection performance of the random access signal. At the same time, it also can improve the leak detection performance of the signal with the small power when the signals with large powers and the signals with small powers coexisted in the present cell, so as to further improve the system performance. In addition, because the method provided by the embodiment of the present disclosure does not need the characteristics of the interference signal of the adjacent cell, and also does not need to reconstruct the interference signal of the adjacent cell and the interference signal of the present cell, while it directly realizes the interference cancellation, the amount of computation is small and the resources are saved, which is conducive to the implementation of the system.

Through the illustration of the specific embodiments, it should be able to deeply and specifically understand the technical means, adopted by the present disclosure to achieve the intended purpose, and the effects, however, the accompanying figures are only used to provide reference and illustration, which are not used to limit the present invention. At the same time, in the case of not conflicting, the embodiments and features in these embodiments can be combined with each other. Those skilled in the art shall understand that the embodiment of the present disclosure can be provided as a method, or computer program product. Therefore, the present disclosure can use the form of hardware embodiment, software embodiment, or embodiment combining with software and hardware. Moreover, the present disclosure can use the form of computer program products executed on one or more computer available storage mediums (including but not limited to the disk storage and optical memory etc.) which contains the computer available program code.

The present disclosure is described referring to and according to a flow chart and/or a block diagram of a method, and a computer program product. It should be understood that the computer program instructions can realize each flow and/or block in the flow chart and/or block diagram, and a combination of a flow and/or block in the flow chart and/or block diagram. These computer program instructions can be provided to a general computer, special computer, embedded processor or processors of other programming data processing devices to produce a machine that enables to generate an apparatus used for realizing the function specified in one flow or multiple flows of the flow chart and/or one block or multiple blocks in the block diagram through the instructions executed by the computer or the processors of other programming data processing devices.

The computer program instructions can also be stored in the computer readable memory which can lead the computer or other programmable data processing devices to work in a specific way, which makes the instructions stored in the computer readable memory to generate a manufacturing product including the instruction device, and the instruction device is used to realize the function specified in one flow or multiple flows of the flow chart and/or one block or multiple blocks in the block diagram.

The computer program instructions can also be loaded onto the computer or other programmable data processing devices, which makes to execute a series of operating steps on the computer or other computer programming devices to generate the processing realized by the computer; thus providing steps for realizing the function specified in one flow or multiple flows of the flow chart and/or one block or multiple blocks in the block diagram on the instructions executed on the computer or other programmable devices.

The above description is only better embodiments of the present invention, not used to limit the protection scope of the present invention.

INDUSTRIAL APPLICABILITY

As mentioned above, a method, apparatus and system for detecting a random access signal provided by the embodiment of the present disclosure have the following beneficial effects: realizing the interference cancellation, to achieve the objective of improving the leak detection performance and the false detection performance of the random access signal. At the same time, it also can improve the leak detection performance of the signal with the small power when the signals with large powers and the signals with small powers coexisted in the present cell, so as to further improve the system performance. In addition, because the method provided by the embodiment of the present disclosure does not need the characteristics of the interference signal of the adjacent cell, and also does not need to reconstruct the interference signal of the adjacent cell and the interference signal of the present cell, while it directly realizes the interference cancellation, the amount of computation is small and the resources are saved, which is conducive to the implementation of the system.

What we claim is:

1. A method for detecting a random access signal, comprising:

determining a temporary peak detection sequence according to a received time domain random access signal;

determining an interference cancellation weight for a frequency domain cyclic shift sequence corresponding to a search window in the temporary peak detection sequence, and performing interference cancellation on the temporary peak detection sequence according to the interference cancellation weight, and thus obtaining a final peak detection sequence; and performing peak detection on the final peak detection sequence; wherein, the interference cancellation is specifically obtained according to $\hat{Y}=WY$, wherein, W is the interference cancellation weight, $\hat{Y}$ is a frequency domain random access signal after the interference cancellation, and a dimension of $\hat{Y}$ is 1×N; and wherein Y is a frequency domain random access signal before the interference cancellation, a dimension of Y is M×N, M is a number of receiving antennas, and N is a number of subcarriers; and wherein, said determining a temporary peak detection sequence according to a received time domain random access signal further comprises:

transforming the received time domain random access signal from time domain to frequency domain through fast Fourier transform FFT, obtaining a frequency domain random access signal; and performing a conjugate dot product on the frequency domain random access signal and a frequency domain value of a cyclic shift sequence; and then, transforming the frequency domain random access signal from the frequency domain to the time domain through inverse fast Fourier transform IFFT, obtaining a temporary peak detection sequence.

2. The method according to claim 1, wherein, the temporary peak detection sequence is a temporary peak detection sequence of the cyclic shift sequence.

3. The method according to claim 1, wherein, said determining interference cancellation weights for a frequency domain cyclic shift sequence corresponding to a search window in the temporary peak detection sequence and performing interference cancellation on the temporary peak detection sequence according to the interference cancellation weight, and thus obtaining a final peak detection sequence specifically comprises: determining the interference cancellation weight corresponding to the frequency domain cyclic shift sequence in turn for the frequency domain cyclic shift sequence corresponding to the search window in the temporary peak detection sequence, and then performing weighted combination and then computing modular square on the temporary peak detection sequence according to the interference cancellation weight, and thus obtaining the final peak detection sequence.

4. The method according to claim 1, wherein, said performing the peak detection on the final peak detection sequence specifically comprises: performing a noise mean estimation on the final peak detection sequence, and determining a signal detection threshold according to an obtained estimation value, then detecting a signal in the search window corresponding to a current frequency domain cyclic shift sequence, and filtering a signal exceeding the signal detection threshold.

5. The method according to claim 1, wherein, said determining the interference cancellation weight is specifically obtained according to formula $W=R_{SY}R_{YY}^{-1}$, wherein, W is the interference cancellation weight, $R_{SY}=E\{SY^H\}$, $R_{YY}=E\{YY^H\}$, S is a local frequency domain cyclic shift sequence, and a dimension of S is 1×N.

6. The method according to claim 1, wherein, said performing the peak detection on the final peak detection sequence comprises: performing power combination first on a final peak detection sequence of which a random access signal is in a repeat format, then performing a noise mean estimation on a combined final peak detection sequence, and determining a signal detection threshold according to an obtained estimation value, then detecting a signal in the search window corresponding to a current frequency domain cyclic shift sequence, and filtering a signal exceeding the signal detection threshold.

7. The method according to claim 6, wherein, the power combination is an equal gain combination or a maximum ratio combination.

8. The method according to claim 1, wherein, said determining an interference cancellation weight for a frequency domain cyclic shift sequence corresponding to a search window in the temporary peak detection sequence and performing interference cancellation on the temporary peak detection sequence according to the interference cancellation weight, and thus obtaining a final peak detection sequence specifically comprises: determining all interference cancellation weights corresponding to the frequency domain cyclic shift sequence according to the frequency domain cyclic shift sequence corresponding to all search windows in the temporary peak detection sequence, performing weighted combination and then computing modular square on signals in all search windows in the temporary peak detection sequence respectively according to the interference cancellation weight, and thus obtaining the final peak detection sequence.

9. An apparatus for detecting a random access signal, comprising the following modules:

an obtaining module, arranged to: determine a temporary peak detection sequence according to a received time domain random access signal;

an interference cancellation module, arranged to: determine an interference cancellation weight for a frequency domain cyclic shift sequence corresponding to a search window in the temporary peak detection sequence, and perform interference cancellation on the temporary peak detection sequence according to the interference cancellation weight, to thereby obtain a final peak detection sequence; and a detection module, arranged to: perform peak detection on the final peak detection sequence; wherein, the interference cancellation is specifically obtained according to $\hat{Y}=WY$, wherein, W is the interference cancellation weight, $\hat{Y}$ is a frequency domain random access signal after the interference cancellation, and a dimension of $\hat{Y}$ is 1×N;, wherein Y is a frequency domain random access signal before the interference cancellation, a dimension of Y is M×N, M is a number of receiving antennas, and N is a number of subcarriers; and wherein, the obtaining module comprises:

a time-frequency conversion submodule, arranged to: perform fast Fourier transform FFT on a received time domain random access signal, and obtain a frequency domain random access signal;

a cross correlation submodule, arranged to: perform a conjugate dot product on the frequency domain random access signal with a frequency domain value of a cyclic shift sequence; and a frequency-time conversion submodule, arranged to: perform inverse fast Fourier transform IFFT on an output result of the cross correction submodule, and obtain a temporary peak detection sequence.

10. The detection apparatus according to claim 9, wherein, the interference cancellation module comprises:

a weight obtaining submodule, arranged to: determine an interference cancellation weight for a frequency domain cyclic shift sequence corresponding to a search window in the temporary peak detection sequence; and an operation submodule, arranged to: perform weighted combination and then compute modular square on the temporary peak detection sequence according to an output result of the weight obtaining submodule, and obtain the final peak detection sequence.

11. The detection apparatus according to claim 9, wherein, the detection module further comprises: a combination submodule, arranged to: when the random access signal is a random access signal in a repeat format, perform power combination on the final peak detection sequence corresponding to two repeated parts.

12. A system for detecting a random access signal, comprising a terminal and a base station, wherein, the base station comprises an apparatus for detecting a random access signal of claim 9.

13. A system for detecting a random access signal, comprising a terminal and a base station, wherein, the base station comprises an apparatus for detecting a random access signal of claim 10.

14. A system for detecting a random access signal, comprising a terminal and a base station, wherein, the base station comprises an apparatus for detecting a random access signal of claim 11.

\* \* \* \* \*